United States Patent
Chernyak et al.

(10) Patent No.: US 6,580,693 B1
(45) Date of Patent: Jun. 17, 2003

(54) METHODS AND APPARATUS FOR DETECTING LEAKS IN ATM NETWORKS

(75) Inventors: Arcady Chernyak, Rosh-Ha-Ain (IL); Eldad Bar-Eli, Ramat-Hasharon (IL); Miki Kennet, Tel-Aviv (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/316,973

(22) Filed: May 24, 1999

(51) Int. Cl.$^7$ .............................................. G01R 31/08
(52) U.S. Cl. ..................... 370/248; 370/242; 370/395.2
(58) Field of Search .................................. 370/216, 217, 370/218, 223, 224, 225, 227, 228, 236.1, 236.2, 242, 243, 244, 248, 395.2, 395.3

(56) References Cited

U.S. PATENT DOCUMENTS

| | | | |
|---|---|---|---|
| 4,823,338 A | 4/1989 | Chan et al. | 370/85 |
| 4,975,906 A | 12/1990 | Takiyasu et al. | 370/85.13 |
| 5,214,646 A | 5/1993 | Yacoby | 370/85.13 |
| 5,280,476 A | 1/1994 | Kojima et al. | 370/60.1 |
| 5,280,481 A | 1/1994 | Chang et al. | 370/85.13 |
| 5,315,582 A | 5/1994 | Morizono et al. | 370/16 |
| 5,321,693 A | 6/1994 | Perlman | 370/85.13 |
| 5,321,694 A | 6/1994 | Chang et al. | 370/85.13 |
| 5,329,527 A | 7/1994 | Ujihashi et al. | 370/85.13 |

(List continued on next page.)

FOREIGN PATENT DOCUMENTS

| | | | |
|---|---|---|---|
| WO | WO97/04386 | 2/1997 | G06F/9/455 |
| WO | WO98/02821 | 1/1998 | G06F/13/00 |

OTHER PUBLICATIONS

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

(List continued on next page.)

*Primary Examiner*—Alpus H. Hsu
*Assistant Examiner*—Thien D Tran
(74) *Attorney, Agent, or Firm*—Howard Zaretsky, Esq.

(57) ABSTRACT

A method for detecting leaks in an ATM network, the method including the steps of a) creating an entity interconnection map including mappings of port interconnections among a plurality of network nodes, the plurality of network nodes includes a plurality of network endpoints and at least one network switch, b) creating an endpoint map including at least one endpoint mapping of at least one port to at least one virtual identifier for at least one of the network endpoints and a leak indicator for the at least one network endpoint indicating that the network endpoint is either of a transmitting endpoint and a receiving endpoint, c) creating a switch map including at least one switch mapping of at least one port and virtual identifier grouping to at least one other port and virtual identifier grouping for the at least one network switch, d) initializing a leak indicator for each of the endpoint mappings and the switch mappings to indicate a leak condition, e) traversing a virtual channel connection from each transmitting endpoint in the endpoint map to a corresponding receiving endpoint in the endpoint map via the switch map, and f) setting each leak indicator for each endpoint mapping and switch mapping traversed along the virtual channel connection to indicate a no-leak condition.

17 Claims, 5 Drawing Sheets

U.S. PATENT DOCUMENTS

| | | | |
|---|---|---|---|
| 5,329,619 A | 7/1994 | Page et al. | 395/200 |
| 5,345,558 A | 9/1994 | Opher et al. | 395/200 |
| 5,390,184 A | 2/1995 | Morris | 370/94.2 |
| 5,394,402 A | 2/1995 | Ross | 370/94.1 |
| 5,408,469 A | 4/1995 | Opher et al. | 370/60.1 |
| 5,444,702 A | 8/1995 | Burnett et al. | 370/60.1 |
| 5,483,536 A | 1/1996 | Gunji et al. | 370/85.14 |
| 5,519,704 A | 5/1996 | Farinacci et al. | 370/85.13 |
| 5,548,646 A | 8/1996 | Aziz et al. | 380/23 |
| 5,548,723 A | 8/1996 | Pettus | 395/200.01 |
| 5,550,816 A | 8/1996 | Hardwick et al. | 370/60 |
| 5,550,818 A | 8/1996 | Brackett et al. | 370/60 |
| 5,566,014 A | 10/1996 | Glance | 359/124 |
| 5,583,865 A | 12/1996 | Esaki et al. | 370/397 |
| 5,600,644 A | 2/1997 | Chang et al. | 370/404 |
| 5,633,869 A | 5/1997 | Burnett et al. | 370/396 |
| 5,659,542 A | 8/1997 | Bell et al. | 370/496 |
| 5,666,487 A | 9/1997 | Goodman et al. | 395/200.76 |
| 6,215,765 B1 * | 4/2001 | McAllister et al. | 370/217 |
| 6,222,820 B1 * | 4/2001 | Hamami | 370/218 |
| 6,389,555 B2 * | 5/2002 | Purcell et al. | 709/242 |
| 6,424,629 B1 * | 7/2002 | Rubino et al. | 370/241.1 |

OTHER PUBLICATIONS

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

| ENTITY NUMBER | PORT | ENTITY NUMBER | PORT |
|---|---|---|---|
| 10 | 4 | 14 | 1 |
| 10 | 5 | 16 | 1 |
| 14 | 1 | 10 | 4 |
| 14 | 5 | 18 | 2 |
| 16 | 1 | 10 | 5 |
| 16 | 6 | 18 | 1 |
| 18 | 1 | 16 | 6 |
| 18 | 2 | 14 | 5 |
| 18 | 4 | 12 | 1 |
| 18 | 6 | 12 | 2 |

| ENTITY NUMBER | PORT | VPI | VCI | MODE | LEAK INDICATOR |
|---|---|---|---|---|---|
| 10 | 4 | 6 | 101 | Tx | LEAK |
| 10 | 5 | 8 | 103 | Rx | LEAK |
| 10 | 5 | 8 | 103 | Tx | LEAK |
| 12 | 1 | 10 | 105 | Rx | LEAK |
| 12 | 2 | 12 | 107 | Tx | LEAK |

| ENTITY NUMBER | VC1 | | | VC2 | | | LEAK INDICATOR |
|---|---|---|---|---|---|---|---|
| | PORT | VPI | VCI | PORT | VPI | VCI | |
| 14 | 1 | 6 | 101 | 5 | 14 | 109 | LEAK |
| 14 | 3 | 14 | 109 | 4 | 16 | 111 | LEAK |
| 16 | 1 | 8 | 103 | 6 | 18 | 113 | LEAK |
| 18 | 1 | 18 | 113 | 6 | 12 | 107 | LEAK |
| 18 | 2 | 20 | 115 | 4 | 10 | 105 | LEAK |

FIG.3

METHODS AND APPARATUS FOR DETECTING LEAKS IN ATM NETWORKS

FIELD OF THE INVENTION

The present invention relates to computer networks in general, and more particularly to methods and apparatus for detecting leaks in ATM networks.

BACKGROUND OF THE INVENTION

A basic feature of Asynchronous Transfer Mode (ATM) networks is the ability of network endpoints to set up and tear down virtual channel connections (VCC) through which two endpoints communicate. In order to establish a VCC, a first ATM endpoint sends a "SETUP" message in accordance with the ATM access signaling protocol, also referred to as the user-network interface (UNI) protocol, to an ATM switch to which it is connected. The ATM switch then communicates with other ATM switches to which it is attached in accordance with the ATM network signaling protocol, also referred to as the network-node interface (NNI) protocol, until a path is found to the desired second ATM endpoint. The second ATM endpoint then accepts (or rejects) the connection, thus allowing communications to begin between the endpoints via the VCC.

A VCC is comprised of a sequence of virtual channels (VC), where each VC is defined by a logical connection between two ATM network nodes over a physical link between a port on one node and a port on the other node. For purposes of simplicity, "nodes" as referred to herein include both ATM endpoints and ATM switches. Thus, a VCC between a two endpoints A and D which is switched by two switches B and C along the path A-B-C-D comprises three VCs, one each between A and B, B and C, and C and D. Each VC is identified by a virtual channel identifier (VCI), and typically by a virtual path identifier (VPI) as well, both identifiers being assigned by the various switches along the VCC in accordance with signaling protocols. Commonly in ATM networks, the VPI/VCI of each VC vary along a single VCC, and it is the responsibility of each switch along the VCC to map each incoming VC to each outgoing VC by maintaining in memory the switch port and VPI/VCI of one VC and its mapping to the to the switch port and VPI/VCI of the next VC. Each endpoint also typically keeps track of the endpoint port and VPI/VCI for each VC through which the endpoint communicates. The VPI/VCI and port information maintained by an endpoint or a switch with respect to a VC is referred to herein as a "VC mapping."

An endpoint may tear down a VCC by sending a "RELEASE" message to the ATM switch to which it is connected along the VCC, whereupon each switch along the VCC and each endpoint is supposed to remove from its memory the VC mappings associated with the VCC being torn down. One problem common to ATM networks arises when a switch or endpoint fails to remove from memory a VC mapping of a VCC being torn down, or places in memory a VC mapping that is not associated with a VCC. Such a VC mapping that is not associated with a currently established VCC is referred to herein as a "leak," which are difficult to detect.

FIG. 1 is a simplified block diagram which more clearly illustrates the concept of leaks in a prior art ATM network. Shown in FIG. 1 are five ATM network nodes including two endpoints 10 and 12, and three switches 14, 16, and 18. Each node in the illustration is configured with six ports 20, numbered from 1 to 6. A first VCC 22 is shown connecting endpoints 10 and 12 and is defined by three VCs 24, 26, and 28. A second VCC 30 is shown connecting endpoints 10 and 12 and is defined by three VCs 32, 34, and 36. A leak 38 is shown with respect to switch 14, ports 3 and 4 of which are mapped to each other not in connection with either VCC 22 or 30.

The following publication is believed to be descriptive of the current state of the art of ATM technology and terms related thereto:

Kwok, T., "ATM: The New Paradigm for Internet, Intranet, and Residential Broadband Services and Applications," Prentice Hall, 1998.

The disclosures of all patents, patent applications, and other publications mentioned in this specification and of the patents, patent applications, and other publications cited therein are hereby incorporated by reference.

SUMMARY OF THE INVENTION

The present invention seeks to provide methods and apparatus for detecting leaks in ATM networks.

There is thus provided in accordance with a preferred embodiment of the present invention a method for detecting leaks in an ATM network, the method including the steps of a) creating an entity interconnection map including mappings of port interconnections among a plurality of network nodes, the plurality of network nodes includes a plurality of network endpoints and at least one network switch, b) creating an endpoint map including at least one endpoint mapping of at least one port to at least one virtual identifier for at least one of the network endpoints and a leak indicator for the at least one network endpoint indicating that the network endpoint is either of a transmitting endpoint and a receiving endpoint, c) creating a switch map including at least one switch mapping of at least one port and virtual identifier grouping to at least one other port and virtual identifier grouping for the at least one network switch, d) initializing a leak indicator for each of the endpoint mappings and the switch mappings to indicate a leak condition, e) traversing a virtual channel connection from each transmitting endpoint in the endpoint map to a corresponding receiving endpoint in the endpoint map via the switch map, and f) setting each leak indicator for each endpoint mapping and switch mapping traversed along the virtual channel connection to indicate a no-leak condition.

Further in accordance with a preferred embodiment of the present invention the method further includes the step of reporting a leak condition for any of the mappings whose leak indicator indicates a leak condition.

Still further in accordance with a preferred embodiment of the present invention the virtual identifiers include either of a virtual channel identifier and a virtual path identifier.

Additionally in accordance with a preferred embodiment of the present invention the method further includes the steps of g) performing all of the steps a)–f) on a first representation of the ATM network at a first moment in time, h) thereafter performing all of the steps a)–f) on a second representation of the ATM network at a second moment in time, and i) identifying any of the mappings which exists at both of the first and second moments in time and whose leak indicator indicates a leak condition at both of the first and second moments in time.

Moreover in accordance with a preferred embodiment of the present invention the method further includes the steps of l) initializing a true leak indicator for any of the mappings which exists at both of the first and second moments in time to indicate a no-true-leak condition, and m) setting each of the true leak indicators to indicate a true-leak condition for any of the mappings identified in step i).

Further in accordance with a preferred embodiment of the present invention the method further includes the step of reporting a true leak condition for any of the mappings identified in step i).

Still further in accordance with a preferred embodiment of the present invention the creating step b) includes receiving a notification from any of the network endpoints, the notification including the mapping of at least one port to at least one virtual identifier and the leak indicator indicating that the network endpoint is either of a transmitting endpoint and a receiving endpoint.

Additionally in accordance with a preferred embodiment of the present invention the creating step c) includes receiving a notification from any of the network switches, the notification including the mapping of at least one port and virtual identifier grouping to at least one other port and virtual identifier grouping.

Moreover in accordance with a preferred embodiment of the present invention the notification is received as the result of an SNMP trap.

It is appreciated throughout the specification and claims that the terms network, node, switch, endpoint, and port may refer to any hardware and/or software implementation thereof, including software simulations thereof.

BRIEF DESCRIPTION OF THE DRAWINGS

The present invention will be understood and appreciated more fully from the following detailed description taken in conjunction with the appended drawings in which:

FIG. 3 is a simplified conceptual illustration of logical groupings of ATM network data useful in understanding the method of FIG. 2;

DETAILED DESCRIPTION OF THE PRESENT INVENTION

Figure 1:
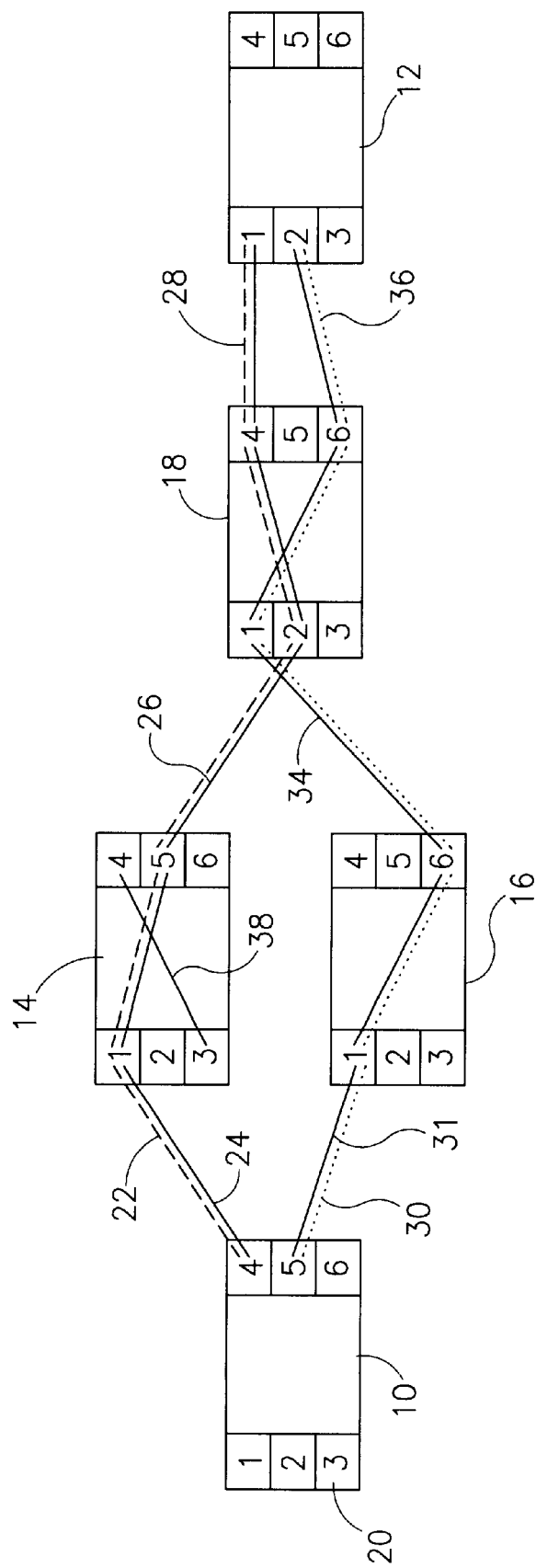
FIG. 1 is a simplified block diagram of a prior art ATM network in which leaks are present.
Figure 2:
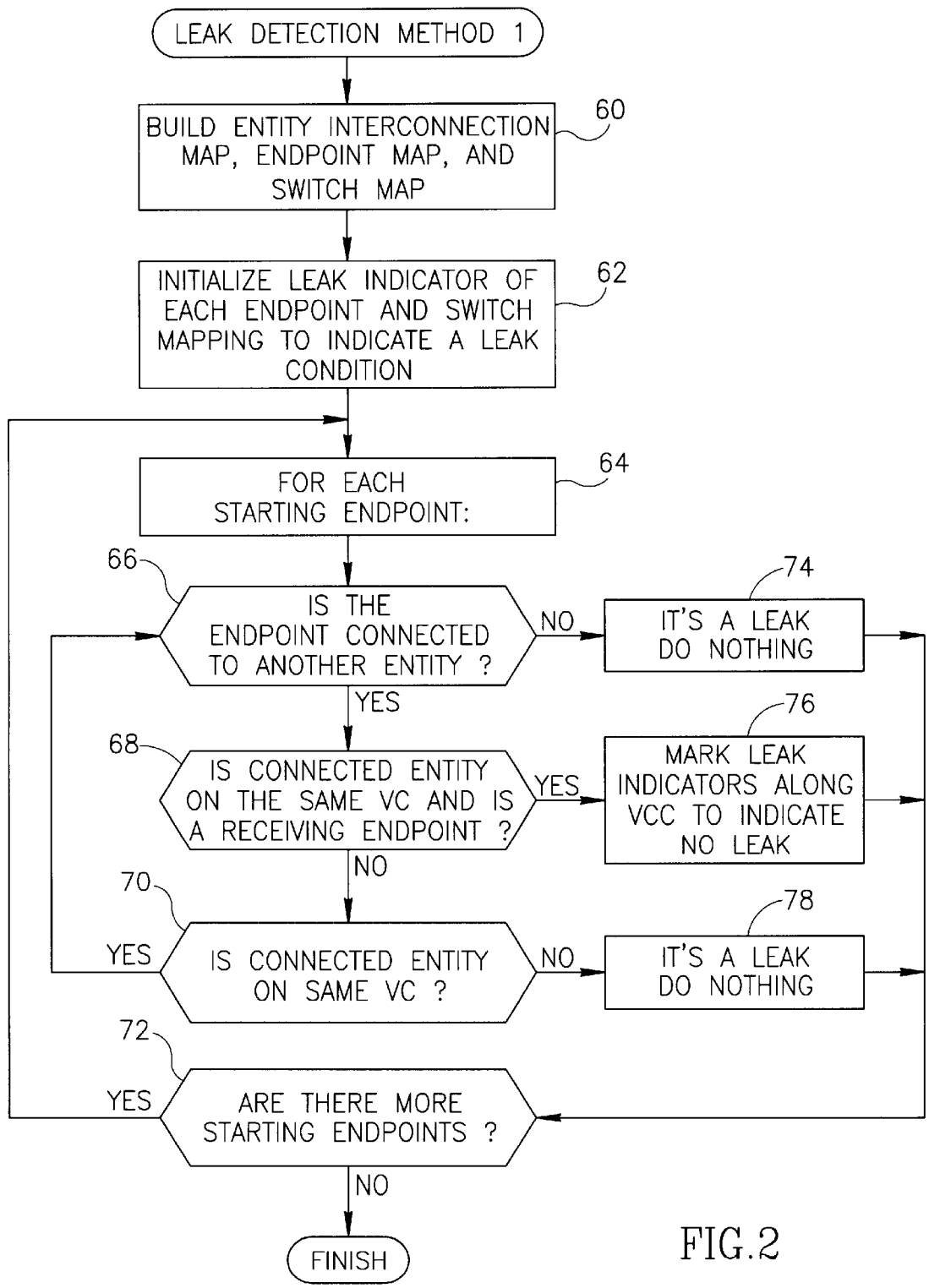
FIG. 2 is a simplified flowchart illustration of a method for detecting leaks in an ATM network, the method being operative in accordance with a preferred embodiment of the present invention.

Reference is now made to FIG. 2 which is a simplified flowchart illustration of a method for detecting leaks in an ATM network, the method being operative in accordance with a preferred embodiment of the present invention, and additionally to FIG. 3 which is a simplified conceptual illustration of logical groupings of ATM network data useful in understanding the method of FIG. 2. FIG. 1 is also useful in understanding FIGS. 2 and 3 as the illustrative entity, port, and connectivity data shown in FIG. 3 correspond to endpoints 10 and 12, switches 14, 16, and 18, ports 20, and associated connections as they appear in FIG. 1.

In the method of FIG. 2 three types of data are assembled: entity interconnection data, endpoint VC data, and switch VC data (step 60). An entity interconnection map 40 is typically created including a list of pairs of network nodes, alternately referred to herein as "entities," and the ports via which the nodes are connected. For example, record 42 (shown in dashed lines) of map 40 shows that endpoint 10 is connected at port 4 to switch 14 at port 1.

An endpoint map 44 is typically created including mappings of each port and VPI/VCI associated with each VC known to each endpoint. For example, a record 46 (shown in dashed lines) of map 44 shows that endpoint 10 has established a VC at port 4 having a VPI=6 and a VCI=101. Map 44 also typically includes a leak indicator 48 for storing an indication of a leak, as will be described below. Map 44 also typically includes a mode indicator 50 which indicates whether the endpoint is a "transmitting" endpoint that initiated the call, indicated by an identifier such as "Tx," or whether the endpoint is a "receiving" endpoint that received the call, indicated by an identifier such as "Rx."

A switch map 52 is typically created including mappings of each port and VPI/VCI for incoming VCs to the port and VPI/VCI of outgoing VCs known to each switch For example, a record 54 (shown in dashed lines) of map 52 shows that switch 14 has established a VC, referred to as $VC_1$, at port 1 having a VPI=6 and a VCI=101, and that the VC is mapped to a VC, referred to as $VC_2$, established at port 5 having a VPI=14 and a VCI=109. Map 52 also typically includes leak indicator 48 for storing an indication of a leak, as will be described below.

The data collected in maps 40, 44 and 52 are preferably collected to provide a "snapshot" of the state of the ATM network at a specific moment in time. A preferred method of collecting data for maps 40, 44 and 52 is described in greater detail hereinbelow with reference to FIG. 5. Once the data is collected, the leak indicator 48 of each endpoint and switch mapping is initialized to indicate a leak condition, such as is indicated by a predetermined value such as "Leak" (step 62).

Each transmitting endpoint in map 44 indicating a mode=Tx is selected as a starting endpoint, and an attempt is made to traverse a virtual channel connection from each starting endpoint to a corresponding receiving endpoint in map 44 indicating a mode=Rx (step 64). Alternatively, a receiving endpoint indicating a mode=Rx may be selected as a starting endpoint, with the traversal of the virtual channel connection being made to a corresponding transmitting endpoint in map 44 indicating a mode=Tx. The leak indicator for each endpoint mapping and switch mapping along a successfully traversed virtual channel connection is then set to indicate a no-leak condition, such as is indicated by a predetermined value such as "No leak." The traversal of virtual channel connections is preferably done as follows.

1) Look in the map 40 and find any records B indicating the entity and port in record A (step 66);

2) If no record B is found, it's a leak—do nothing. Proceed to the next record A in map 44 (step 74). Return to step 1).

3) If such a record B is found, look in map 44 for the first record C that (step 68):

4) If such a record C is found, then set the link indicator for records A and C to indicate "No leak" (step 76).

5) If no such record C is found, look in map 48 for the first record D for which $VC_1$ (step 70):

6) If no such record D is found, it's a leak—do nothing (step 78). Proceed to the next record in map 44. Return to step 1).

7) If such a record D is found, look in map 44 for the first record E that:
   a) indicates the entity in record D;
   b) has a port and VPI/VCI matching $VC_2$ of record D; and
   c) has a mode=Rx.
8) If such a record E is found then set the link indicator for records A, D, and E to indicate "No leak."
9) If no such record E is found, repeat steps 1)–8), preferably recursively, using the entity, port, and VPI/VCI of $VC_2$ of record D in place of the corresponding values in record A. If records C or E are found during any recursion, set the link indicators for records A, D, and E in all previous recursions in the current recursion chain to indicate "No leak."

It is appreciated that ATM network having one or more VP switches that provide VP tunneling may be accommodated by the method of FIG. 2 by storing a predetermined value in the VCI fields of map 48 to indicate that the VC is a VP tunnel connection.

It is appreciated that the logical groupings of data shown in FIG. 3 may be logically and physically implemented in a variety of ways using conventional techniques.

Figure 4:
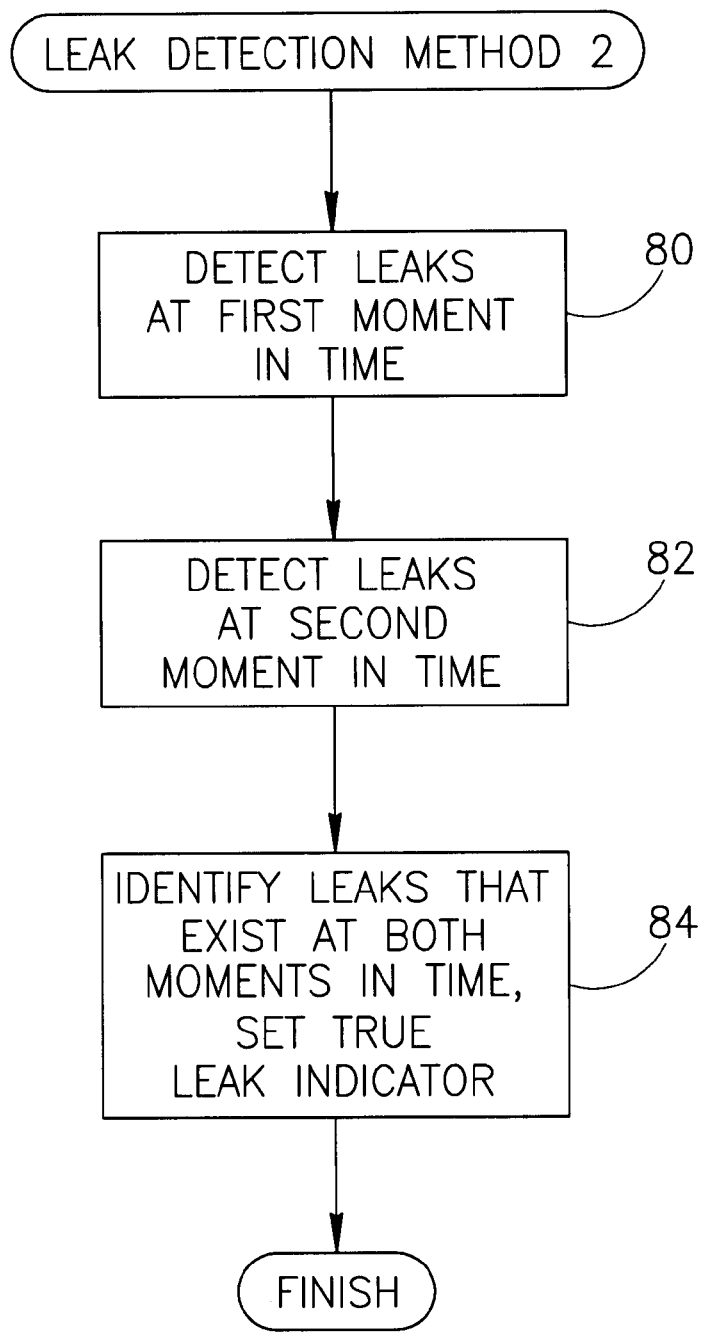
FIG. 4 is a simplified flowchart illustration of another method for detecting leaks in an ATM network, the method being operative in accordance with a preferred embodiment of the present invention.

Reference is now made to FIG. 4 which is a simplified flowchart illustration of another method for detecting leaks in an ATM network, the method being operative in accordance with a preferred embodiment of the present invention. The method of FIG. 4 is substantially similar to the method of FIG. 2 with the exception that the steps of the method of FIG. 2 are carried out at at least two different moments in time, with the data collected in maps 40, 44 and 52 being maintained separately for each time the steps of the method of FIG. 2 are performed. The data in maps 40, 44 and 52 collected at a first moment in time (step 80) are then compared to corresponding data collected at a second moment in time (step 82). Mappings are then identified that exist at both moments in time and whose leak indicator indicates a leak condition at both moments in time (step 84). Such mappings provide a more reliable indication if a true leak condition where the same leak has been detected at two different moments in time. Optionally, a true leak indicator may be initialized for any of the mappings which exists at both moments in time to indicate a no-true-leak condition, and set each of the true leak indicators to indicate a true-leak condition for any of the mappings where the same leak has been detected at two different moments in time.

Figure 5:
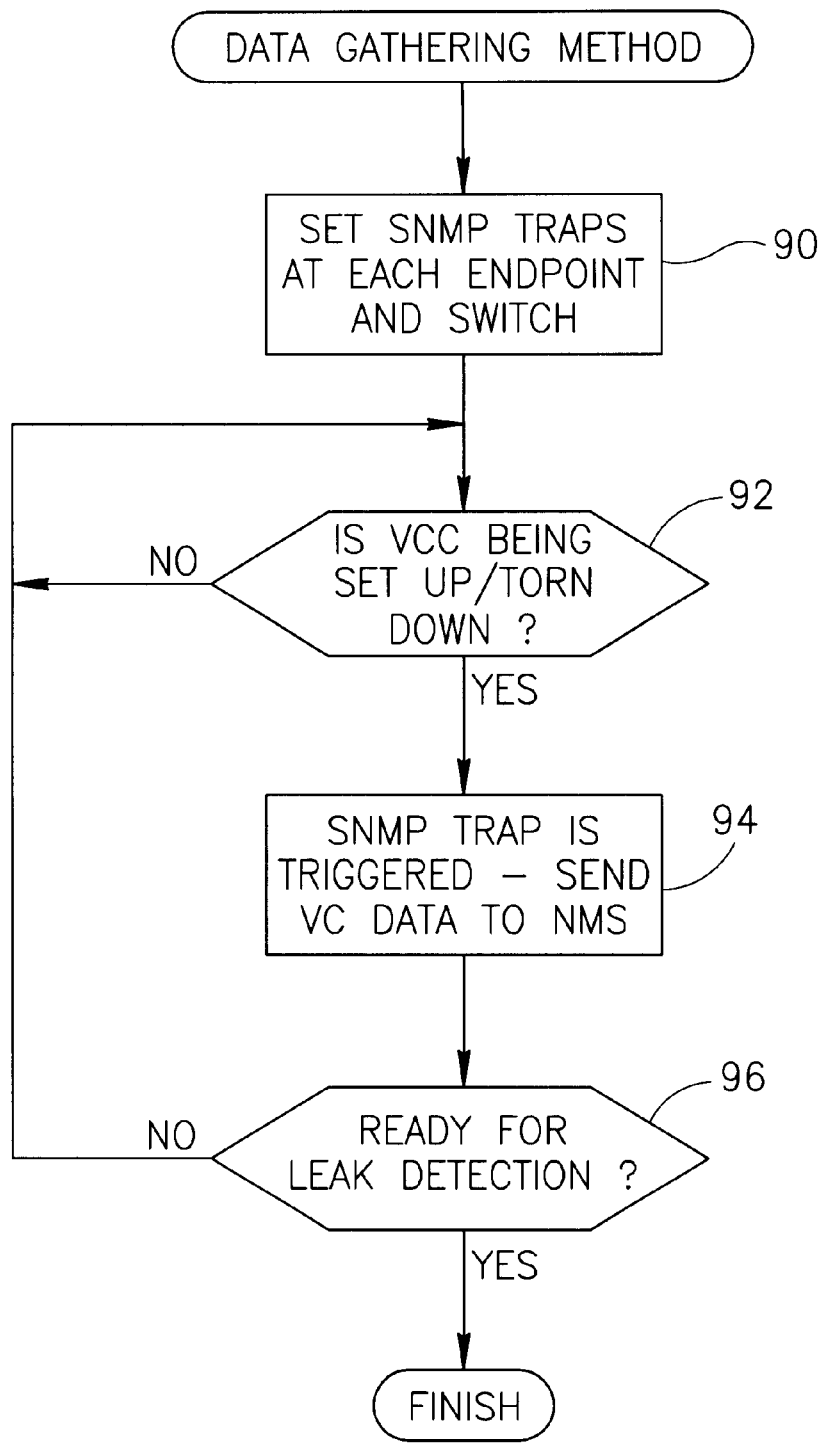
FIG. 5 is a simplified flowchart illustration of a method for providing a snapshot of an ATM network using SNMP traps, the method being operative in accordance with a preferred embodiment of the present invention.

Reference is now made to FIG. 5, which is a simplified flowchart illustration of a method for providing a snapshot of an ATM network using SNMP traps, the method being operative in accordance with a preferred embodiment of the present invention. In the method of FIG. 4 the ATM network may be a real network where the data collected in maps 40, 44 and 52 (FIG. 3) are collected by setting Simple Network Management Protocol (SNMP) traps for each endpoint and switch (step 90). When a VCC is set up or torn down, an SNMP trap is triggered at each endpoint or switch involved in setting up or tearing down the VCC (step 92). As a result of the trap, the switch or endpoint provides the VC and port data to a Network Management System (NMS) which may implement the methods described herein or which may provide the collected data to another computer (step 94). Next, if ready for leak detection, the method terminates. If not, the method continues with step 92.

It is appreciated that the leak detection methods described herein may be implemented entirely as a software simulation on one or more computers. In such a simulation, the program instructions normally assembled with each endpoint and switch that relate to VCC connection setup and tear down are run as one or more processes in a computer memory, preferably with each switch and endpoint running as a separate process. Data traps may then be added to each process in order to gather the data needed for maps 40, 44, and 52 (FIG. 3).

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for detecting leaks in an Asynchronous Transfer Mode (ATM) network, the method comprising the steps of:
   first creating an entity interconnection map comprising mappings of port interconnections among a plurality of network nodes, wherein said plurality of network nodes comprises a plurality of network endpoints and at least one network switch;
   second creating an endpoint map comprising at least one endpoint mapping of at least one port to at least one virtual identifier for at least one of said network endpoints and a leak indicator for said at least one network endpoint indicating that said network endpoint is either a transmitting endpoint or a receiving endpoint;
   third creating a switch map comprising at least one switch mapping of at least one port and virtual identifier grouping to at least one other port and virtual identifier grouping for said at least one network switch;
   initializing a leak indicator for each of said endpoint mappings and said switch mappings to indicate a leak condition;
   traversing a virtual channel connection from each transmitting endpoint in said endpoint map to a corresponding receiving endpoint in said endpoint map via said switch map; and
   first setting each leak indicator for each endpoint mapping and switch mapping traversed along said virtual channel connection to indicate a no-leak condition.

2. The method according to claim 1, further comprising the step of reporting a leak condition for any of said mappings whose leak indicator indicates a leak condition.

3. The method according to claim 1, wherein said virtual identifiers comprise either a virtual channel identifier or a virtual path identifier.

4. The method according to claim 1, further comprising the steps of:
   performing said steps of first creating, second creating, third creating, initializing, traversing and first setting on a first representation of said ATM network at a first moment in time;
   subsequently performing said steps of first creating, second creating, third creating, initializing, traversing and first setting on a second representation of said ATM network at a second moment in time; and identifying any of said mappings which exists at both said first moment in time and said second moment in time and whose leak indicator indicates a leak condition at both said first moment in time and said second moment in time.

5. The method according to claim 4, further comprising the steps of:
initializing a true leak indicator for any of said mappings which exists at said first moment in time and said second moment in time to indicate a no-true-leak condition; and
second setting each of said true leak indicators to indicate a true-leak condition for any of said mappings identified in said step of identifying.

6. The method according to claims 4 or 5, further comprising the step of reporting a true leak condition for any of said mappings identified in said step of identifying.

7. The method according to claim 1, wherein said step of second creating comprises receiving a notification from any of said network endpoints, the notification comprising said mapping of at least one port to at least one virtual identifier and said leak indicator indicating that said network endpoint is either a transmitting endpoint or a receiving endpoint.

8. The method according to claim 1, wherein said step of third creating comprises receiving a notification from any of said network switches, the notification comprising said mapping of at least one port and virtual identifier grouping to at least one other port and virtual identifier grouping.

9. The method according to claims 7 or 8, wherein said notification is received as the result of an SNMP trap.

10. A method for detecting leaks in an Asynchronous Transfer Mode (ATM) network, the method comprising the steps of:
first detecting leaks on a first representation of said ATM network at a first moment in time, said step of first detecting leaks comprising the steps of;
first creating an entity interconnection map comprising mappings of port interconnections among a plurality of network nodes, wherein said plurality of network nodes comprises a plurality of network endpoints and at least one network switch;
second creating an endpoint map comprising at least one endpoint mapping of at least one port to at least one virtual identifier for at least one of said network endpoints and a leak indicator for said at least one network endpoint indicating that said network endpoint is either a transmitting endpoint or a receiving endpoint;
third creating a switch map comprising at least one switch mapping of at least one port and virtual identifier grouping to at least one other port and virtual identifier grouping for said at least one network switch;
initializing a leak indicator for each of said endpoint mappings and said switch mappings to indicate a leak condition;
traversing a virtual channel connection from each transmitting endpoint in said endpoint map to a corresponding receiving endpoint in said endpoint map via said switch map;
first setting each leak indicator for each endpoint mapping and switch mapping traversed along said virtual channel connection to indicate a no-leak condition;
subsequently second detecting leaks on a second representation of said ATM network at a second moment in time, wherein said step of second detecting leaks comprises the steps of;
fourth creating an entity interconnection map comprising mappings of port interconnections among a plurality of network nodes, wherein said plurality of network nodes comprises a plurality of network endpoints and at least one network switch;
fifth creating an endpoint map comprising at least one endpoint mapping of at least one port to at least one virtual identifier for at least one of said network endpoints and a leak indicator for said at least one network endpoint indicating that said network endpoint is either a transmitting endpoint or a receiving endpoint;
sixth creating a switch map comprising at least one switch mapping of at least one port and virtual identifier grouping to at least one other port and virtual identifier grouping for said at least one network switch;
initializing a leak indicator for each of said endpoint mappings and said switch mappings to indicate a leak condition;
traversing a virtual channel connection from each transmitting endpoint in said endpoint map to a corresponding receiving endpoint in said endpoint map via said switch map;
second setting each leak indicator for each endpoint mapping and switch mapping traversed along said virtual channel connection to indicate a no-leak condition; and
identifying any of said mappings which exists at both said first moment in time and said second moment in time and whose leak indicator indicates a leak condition at both said first moment in time and said second moment in time.

11. The method according to claim 10, further comprising the step of reporting a leak condition for any of said mappings whose leak indicator indicates a leak condition.

12. The method according to claim 10, wherein said virtual identifiers comprise either a virtual channel identifier or a virtual path identifier.

13. The method according to claim 10, further comprising the steps of:
initializing a true leak indicator for any of said mappings which exists at said first moment in time and said second moment in time to indicate a no-true-leak condition; and
second setting each of said true leak indicators to indicate a true-leak condition for any of said mappings identified in said step of identifying.

14. The method according to claims 10 or 11, further comprising the step of reporting a true leak condition for any of said mappings identified in said step of identifying.

15. The method according to claim 10, wherein said step of second creating and said step of fifth creating comprises receiving a notification from any of said network endpoints, the notification comprising said mapping of at least one port to at least one virtual identifier and said leak indicator indicating that said network endpoint is either a transmitting endpoint or a receiving endpoint.

16. The method according to claim 10, wherein said step of third creating and said step of sixth creating comprises receiving a notification from any of said network switches, the notification comprising said mapping of at least one port and virtual identifier grouping to at least one other port and virtual identifier grouping.

17. The method according to claims 15 or 16, wherein said notification is received as the result of an SNMP trap.

* * * * *